United States Patent [19]

Baker et al.

[11] 3,969,922

[45] July 20, 1976

[54] APPARATUS FOR FEEDING FUEL TO AN ENGINE

[75] Inventors: W. Barry Baker, Newark; John Charles Kochur, New Castle, both of Del.; Estel McKinley Stoneman, Pennsville, N.J.

[73] Assignee: E. I. Du Pont de Nemours and Company, Wilmington, Del.

[22] Filed: June 19, 1975

[21] Appl. No.: 588,644

[52] U.S. Cl. .................................... 73/35; 123/127; 261/128 R; 261/36 A; 261/71

[51] Int. Cl.[2] .................. G01L 23/22; F02M 43/00

[58] Field of Search ......................... 73/35; 123/127; 261/18 R, 36 A, 71

[56] References Cited

UNITED STATES PATENTS 3,274,985 9/1966 Traver ................................ 73/35 X 3,469,954 9/1969 Hoffman ............................ 73/35 X

*Primary Examiner*—Herbert Goldstein

*Attorney, Agent, or Firm*—James A. Costello

[57] ABSTRACT

An improved apparatus for feeding fuel to an internal combustion engine, said apparatus comprising a multiplicity of fuel sources that cooperate with a spill chamber that is surrounded by an overflow trough. Cooperation is by means of a feed line having an on-off valve along its length. The spill chamber feeds fuel to a fuel/air mixer that cooperates with the engine. The improvement comprises (i) a structural relationship between feed line, on-off valve and fuel flow in that the on-off valve is positiond in the feed line so that fuel is forced in a direction generally away from gravity immediately before and after passing through the valve and (ii) the feed line is fixedly positioned to direct fuel into the chamber when the valve is "on" and into the trough when the valve is "off". The invention also concerns an apparatus for measuring fuel octane numbers that incorporates the feeding apparatus just described.

2 Claims, 4 Drawing Figures

(i) FUEL FLOW IS GENERALLY COUNTER TO THE PULL OF GRAVITY.

(ii) THE FEED LINE IS FIXEDLY POSITIONED TO DIRECT FUEL INTO THE CHAMBER WHEN THE VALVE IS "ON" AND TO DRIP FUEL INTO THE TROUGH WHEN VALVE IS "OFF".

FIG. 4
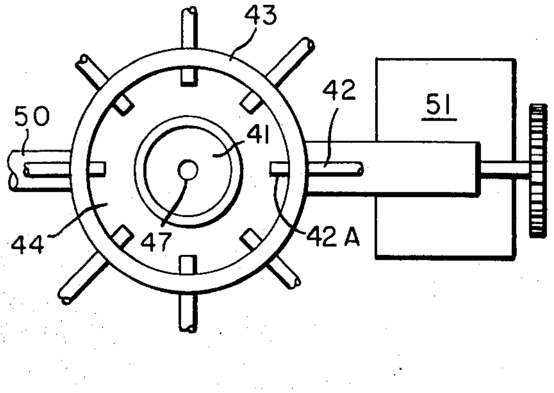
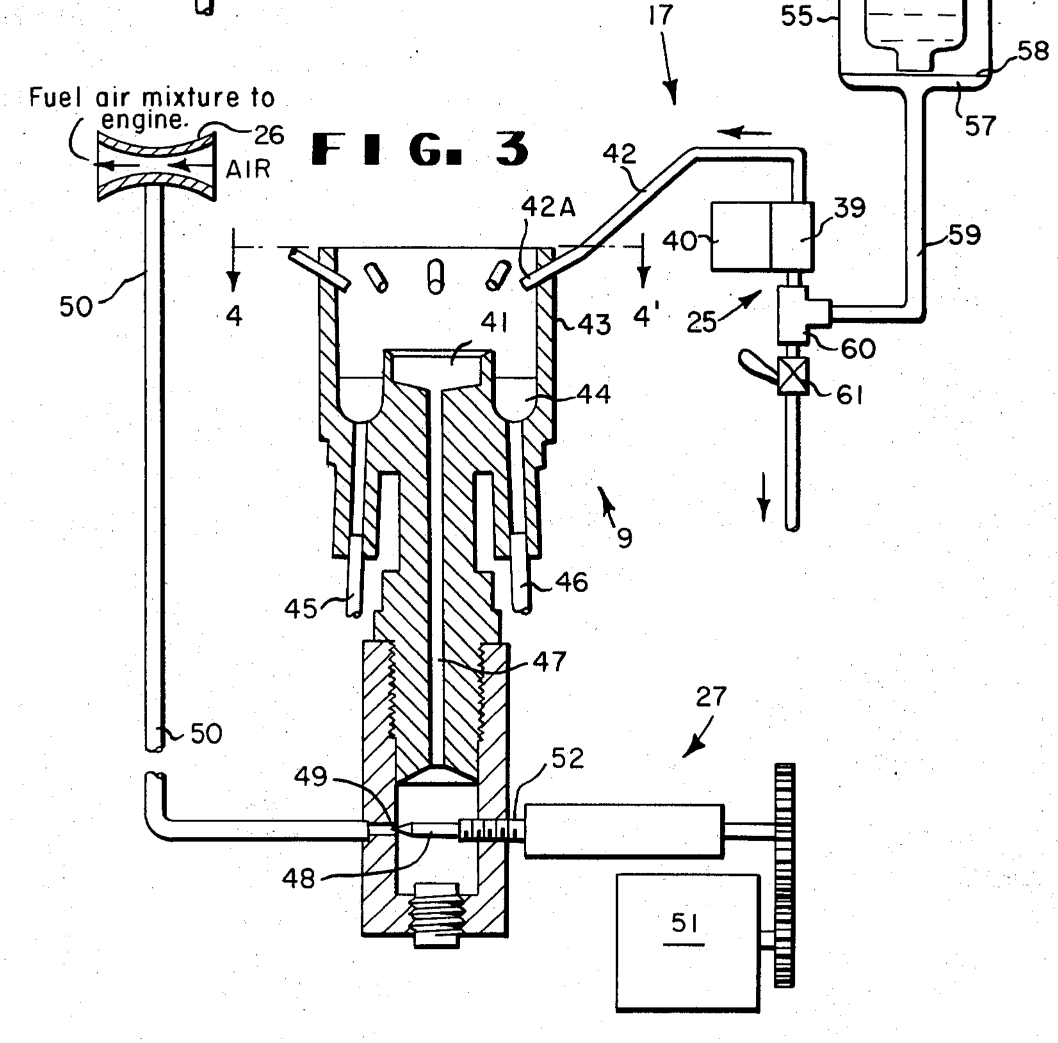
FIG. 3

APPARATUS FOR FEEDING FUEL TO AN ENGINE

BACKGROUND OF THE INVENTION

This invention concerns an improved apparatus that is useful, primarily, for determining fuel octane numbers.

Known apparatuses for determining fuel octane numbers require long running times and long fuel changing times. Long fuel chaning times are necessary to insure test engine operation on a bubble-free fuel uncontaminated by residues from preceding fuels. Fuels for testing are normally fed through lines and valves with low fuel holdups. The lines and valves acquire air from draining fuels used in a prior fuel testing series. The air forms bubbles in the new fuels of the current testing series and causes a delay in the flow response to demand for a bubble-free fuel. Further, bubbles often form in the fuels during standing between their usages in operating the test engine. The delayed flow responses make octane number determinations relying on automated systems unreliable unless extra operating times are allowed and the total testing times are made unduly long.

Engine drift, another problem associated with known apparatuses, makes the determination of octane numbers subject to error during long running times. Engine drift occurs when a knock test engine run on a particular fuel under constant running and measuring conditions generates knock intensity signals which go through intensity changes. Such changes are cuased by deposit build-up and flaking in the engine, changes in operating temperature, changes in voltage supplied to the knock measuring equipment and mechanical shifts in the engine. Because of the engine drift multiple comparisons are often made to obtain reliable octane numbers. This procedure is expensive.

The improvement in the apparatus of this invention allows the quick, accurate and reliable determination of octane numbers. Virtually eliminated are inaccuracies due to fuel-holdup caused by trapped gas, and unmonitored fuel leakage into the spill chamber after the control valve has been turned off.

The apparatus of this invention is useful for the comparison of a multiplicity of fuels, up to 16 or more. Comparison of such a large number of fuels was impossible heretofore; it is possible now primarily because of the disclosed nozzle placement scheme, i.e. relative location and angle vis-a-vis the spill chamber. The apparatus of this invention is also characterized in that it can be quickly and completely emptied after each series of octane number determinations.

The described advantages are especially valuable in an automated system for determining octane numbers where an operator is not available at all times to assure proper feed, etc. and fuel holdup could result in low or no knock in the test engine and give a false indication of high octane fuel.

SUMMARY OF THE INVENTION

This invention concerns an improvement in an apparatus for feeding an internal combustion engine with fuel mixed with air, said apparatus comprising multiple fuel sources with exits that cooperate with a spill chamber surrounded by an overflow trough, each fuel source cooperating through a feed line having an on-off valve along its lenth and an exit to said chamber, said chamber feeding fuel to a fuel/air mixing device that cooperates with said engine, the improvement comprising:

i. the feed line and on-off valve being related to fuel flow direction in that said feed line and on-off valve are positioned so that fuel in the feed line travels generally in a direction away from gravity pull immediately before and after passing through said valve, and ii. the feed line exist is fixedly positioned to direct a jet of fuel into the chamber when the valve is turned on and to drip leaking fuel into said trough surrounding the chamber when the valve is turned off.

As a general rule, the feed line between the fuel source and the spill chamber is of relatively small diameter to insure correspondingly low fuel content therein. With this general rule in mind, it is noted that for best results the portion of the feed line between the fuel source and the on-off valve will have a diameter large enough, e.g. about 3/16 inch inside diameter, to cause any bubbles in the fuel to rise to the fuel source. The fixedly positioned feed line exit, or "nozzle", will have a diameter small enough so that fuel will leave it for the spill chamber in the form of a jet or stream of fuel when the valve is turned on.

The novel apparatus of this invention can be used as part of a larger and more complex apparatus one that is more particularly defined with regard to its function of determining fuel octane numbers of many fuels. The apparatus of this invention fits into the more complex apparatus as that portion of the fuel feed means that feeds the fuel(s) of known and unknown octane number(s) to the test engine. By "spill chamber" as employed herein is meant a fuel-holding chamber having a relatively low volume, being positioned to maintain a constant fuel level relative to the fuel/air mixing device.

The improved octane number-determining apparatus that incorporates the fuel feeding apparatus of this invention is an apparatus wherein fuels of known and unknown octane numbers are fed to a knock test engine from a source of each fuel, said engine generating knock intensity signals for each fuel over a range of fuel feed-rates, said knock intensity signals being converted into octane ratings as described below.

The octane number-determining apparatus comprises:

fuel feed means adapted to feed a fuel of known octane number and a fuel of unknown octane number to the test engine, a knock intensity receptor that accepts knock intensity signals from the test engine and transmits them to memory means, memory means that store knock intensity signals transmitted by the receptor and transmit such signals to the calculating means, calculating means that compare knock intensity signals of known and unknown octane fuels to determine unknown octane numbers, wherein the improvement comprises said fuel feed means having a feeding apparatus between the fuel source and the knock test engine by means of which there is cooperation between the fuel source and a spill chamber surrounded by an overflow trough, through a feed line having an on-off valve along its length and an exit to said chamber, said chamber feeding fuel to said knock test engine, said feeding apparatus characterized in that a. the feed line and on-off valve are related to fuel flow direction in that said feed line and on-off valve are positioned so that fuel in the feed line travels generally in a direction away from gravity pull immediately before and after passing through said valve, and b. the feed line exit is fixedly positioned to direct a jet of fuel into the chamber when the valve is turned on and to drip leaking fuel into said trough surrounding the chamber when the valve is turned off.

An apparatus that incorporates the improvement of this invention is described more fully in the coassigned patent application filed concurrently herewith in the name of William E. Morris, having U.S. Ser. No. 588,645 entitled "Apparatus And Process For Measuring Fuel Octane Numbers"; said application also discloses a process for octane number determination in a knock test engine.

Briefly, the improved apparatus of the coassigned patent application concerns fuel feed means, knock test receptor, memory means and calculating means wherein the fuel feed means, memory means, and calculating means cooperate in operational sequence so that:

i. the fuel feed means variably selects each fuel from a multiplicity of fuels and applies a series of predetermined fuel feed-rate settings at which each of said fuels is fed to the knock test engine;

ii. the memory means receives the knock intensity values generated by the test engine and the corresponding fuel feed-rate settings for use by the calculating means, iii. the calculating means determines the fuel feed-rate setting at which the maximum knock intensity is generated for each fuel, sends that setting to the memory means which stores the approximate fuel feed-rate setting corresponding to maximum knock intensity as determined for each fuel by the calculating means, iv. the calculating means determines a series of fuel feed-rate settings in a range that brackets the approximate fuel feed-rate setting at which the maximum knock intensity is generated for each fuel as already determined in (iii), v. the calculating means directs the fuel feed means to apply the settings of (iv) to generate corresponding knock intensity signals and to determine a refined new maximum knock intensity feed-rate setting for use in the comparison testing of fuels, and vi. the calculating means determines the octane number of each unknown fuel by comparing the knock intensity signals of the known and unknown fuels in sequence, said knock intensity signals being generated at the stored fuel feed-rate settings of (v).

The process, briefly, is an improvement in a process for determining fuel octane numbers from knock intensity signals generated by a test engine by comparing knock intensities of fuels of unkown octane numbers against knock intensities of fuels of known octane numbers, the improvement comprising in sequence, i. operating the test engine on each fuel at a series of feed-rate settings for a time sufficient to generate a knock intensity signal for each fuel at each of the feed-rate settings, said knock intensity signals bracketing the feed-rate settings which gives the maximum knock intensity for each fuel, ii. calculating the approximate setting for each fuel at which the maximum knock intensity signal is generated, iii. operating the engine on each fuel at a narrower series of feed-rate settings than employed in (i), such settings bracketing the approximate maximum knock intensity setting as determined in (ii), to produce a refined feed-rate setting at which the maximum knock intensity signal is generated for each fuel, iv. storing the refined feed-rate setting of maximum knock intensity, v. operating the test engine on each fuel at the stored refined feed-rate setting at which the maximum knock intensity is generated, for a time sufficient to generate a new knock intensity signal, the test engine being operated on the fuels of known and unknown octane numbers in alternating sequence, and vi. calculating the octane numbers of the fuels of unknown octane numbers by comparing the new knock intensity signals produced in (v).

BRIEF DESCRIPTION OF THE DRAWINGS

FIG. 3 shows in more detail an embodiment of schematic FIG. 2 represented by numerical symbols 8, 25, 17, 9, 27, 50 and 26.

FIG. 4 is a view through section 4–4' of FIG. 3.

DETAILS OF THE INVENTION

Figure 1:
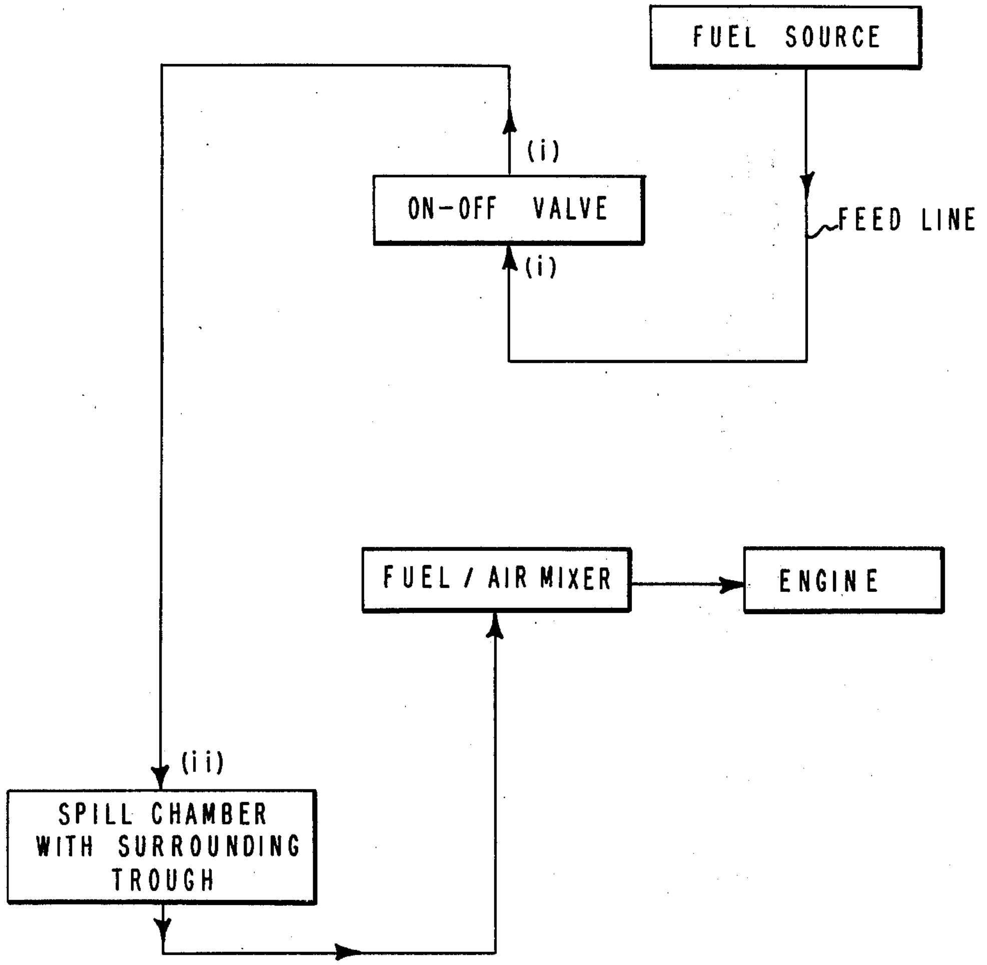
FIG. 1 is a schematic diagram of the feeding apparatus of this invention.

The fuel source used in this invention normally includes a multiplicity of fuel reservoirs, say, 2 to 15, of octane numbers unknown but expected to be in a certain range and at least one, preferably two, reference fuels of known octane number. One reference fuel can be used when it is prototype fuel as described in ASTM D-2885 and a direct match procedure is used. Preferably, two reference fuels are used that span the limits of an expected octane number range.

Reference fuels can be primary reference fuels for finding octane numbers in the 0 to 100 range or in the 100 to 120 range. primary reference fuels in the 0 to 100 octane number range consist of mixtures of 2,2,4-trimethylpentane (isooctane) and n-heptane having their octane numbers characterized by their volume percent content of isooctane. Primary reference fuels in the 100 to 120 octane number range consist of mixtures of isooctane and varying amounts of tetraethyllead, as is well known in the art.

In the following discussion of the Figures, the feeding apparatus is included in the discussion of fuel feed means as will readily be understood. The fuel feed means is described with attention to several of its elements such as fuel selection control device 34, fuel feed chamber 9, fuel-rate metering device 27 and fuel/air mixing throat 26, together with the network by which these components communicate with each other and multiple fuel sources 1 to 8. It will be appreciated that an ASTM Standard Knock Test Engine is operated at constant piston stroke and engine speed, so it uses air at a rate depending only on atmospheric pressure. Thus, a variation of fuel feed is essentially a fuel/air ratio variation.

The apparatus of this invention (for feeding fuel) encompasses a fuel source 8 of FIG. 3, feed line 59, 42 and 42A, on-off valve 39, spill chamber 41, overflow trough 44, as well as the means for supplying fuel from chamber 41 to the test engine.

In the following discussion, the knock intensity receptor is described in terms of its individual components knock pick-up 29, and signal converter 36. One suitable converter used is a 501-T Detonation Meter manufactured by Waukesha Motors Corp. and approved by the ASTM for Knock Test Engine use in combination with an analog-to-digital converter which provides signals at one second intervals that are averaged over the signal measuring time as the basis for knock intensity values.

In the following discussion, fuel-rate metering device 27 controls the rate of flow of fuel to the air intake. Any apparatus that performs this function can be employed and will be obvious to one skilled in the art. The apparatus can operate by sucking fuel from the spill chamber to control its surface level or by raising or lowering the entire chamber. Ordinarily, such a device operates by controlling the eclipse of a fuel-metering hole by a slide across the hole or by a cone axially movable into the hole.

FIG. 1 is a schematic representation of the feeding apparatus of this invention that includes improvements (i) and (ii) as set out in the FIG.

Figure 2:
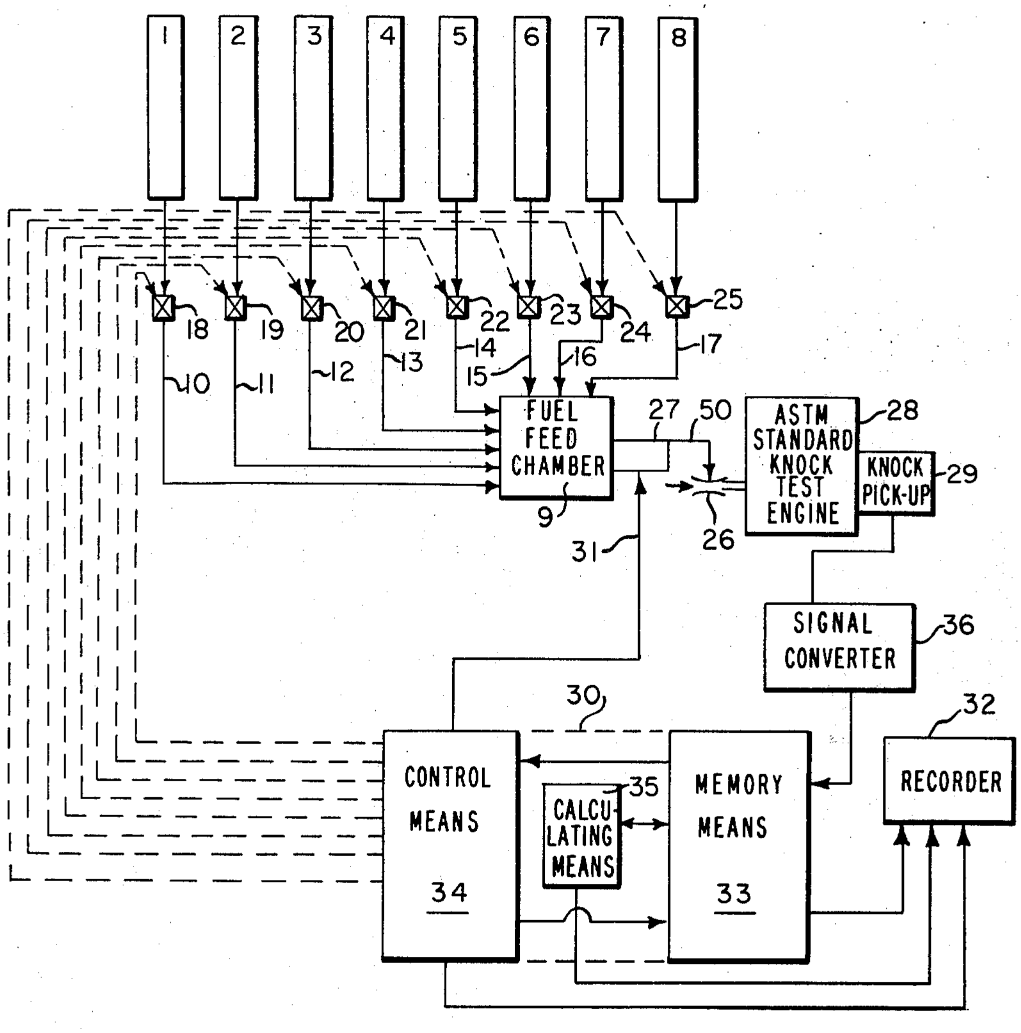
FIG. 2 is a schematic diagram of an octane number-determining apparatus that includes the feeding apparatus of this invention.

In FIG. 2, fuel reservoirs 1 to 8 communicate with fuel feed chamber 9 through lines 10 to 17 having interposed fuel shut-off (on-off) valves 18 to 25 selectively responsive to control means 34. Control means 34 is adapted also to send definite fuel feed-rate settings via line 31 to feed-rate metering device 27.

For additional details concerning the cooperation of items 17 (42), 9, and 27, refer to coassigned patent application entitled "Apparatus and Process For Measuring Fuel Octane Numbers", having U.S. Ser. No. 588,645 filed concurrently herewith in the name of William E. Morris.

The fuel feed means includes any switching device adapted to select a fuel from a reservoir which is responsive to a suitable selective control signal. It is known, for instance, to use a signle selector switch to select a reservoir with fuel for test according to one of a variety of selector control signals. However, it is preferred that each reservoir communicates with the spill chamber through a separate fuel feed line having its own shut-off valve interposed therein, as in FIG. 2.

Fuel is admitted by fuel-rate metering device 27 to test engine 28 via line 50 and fuel/air mixing throat 26. Knock pick-up 29 provides a signal characteristic of knock intensity in the test engine through the analog-to-digital signal converter 36 for transmission to memory means 33.

Memory means 33 is adapted to accept: reservoir selection signals also sent by means 34 to selector valves 18 to 25; feed-rate settings also sent by means 34 to fuel feed-rate metering device 27; and knock intensity signals are transmitted via signal converter 36. In memory means 33, knock intensities are correlated with the feed-rate settings and fuel reservoirs producing them. Transfer of these correlated signals is made to calculating means 35 from which are received optimum feed-rate settings, corresponding to maximum knock intensities, for storage and release to control means 34 upon demand.

Calculating means 35 is adapted to accept knock intensity signals correlated with feed-rate settings and reservoir selection from memory meand 33, to calculate the maximum knock intensity from data points of knock intensity signals against fuel feed-rate settings, to correlate an approximate fuel feed-rate setting with the maximum knock intensity, to transfer that feed-rate setting to memory means 33, to provide additional maximum feed-rate settings for further data points of knock intensity against fuel feed-rate settings, to correlate a refined optimum fuel feed-rate setting with the maximum knock intensity calculated from the further data points and to transfer that setting to memory means 33.

Calculating means 35 is also adapted to accept new knock intensity signals resulting from knock intensity operation on each fuel at its maximum knock intensity fuel feed-rate setting, to compare the new knock intensity signal generated for each fuel having an unknown octane number with corresponding new signals generated for the reference fuels of known octane number, and to calculate the octane number of each fuel of unknown octane number as a function of the relation of its new knock intensity signal to the reference fuel new knock intensity signals. Calculating means 35 is also operatively linked to recorder 32 which records the calculated octane numbers corresponding to fuels from each reservoir. Recorder 32 can be a printer or teletype machine.

In FIG. 2, control means 34, calculating means 35 and memory means 34 are each linked to recorder 32. As will be appreciated by those skilled in the art, there are various types of apparatus that will perform the functions ascribed to elements 32, 33, 34 and 35. It is preferred that all of these elements be combined into an integrated unit and computer 30 is meant to typify such a combination of apparatus elements 32, 33, 34 and 35. Each of said elements is operatively attached to a clock-operated programmer which is not shown. The programmer defines a series of different fuel feed-rate settings each of which results in engine knock at a fixed compression ratio and times the functions of these means.

The computer can be programmed for relatively fast cycles when a single fuel at different feed rates is being fed to determine the maximum knock intensity feed signal for that fuel, such as 30 seconds per setting with the signal measuring time being the last 10 seconds of the 30 seconds. Thus, a series of five knock intensity generations used to generate a maximum knock intensity fuel feed-rate setting can be completed in about 150 seconds. However, when a comparative octane number determination, involving a known fuel, an unknown fuel and a known fuel, as a series of runs, is being made, a relatively long signal measuring time is used, such as 1 minute, preferably after the knock intensity stabilizes for 2 minutes. Such a comparative series of 3 new knock intensity signals comparing fuels can be completed in 9 minutes. To assure fair comparisons in a series, the engine operating time on each setting in the series should be the same. Preferably, each series of knock intensity generations is completed as quickly as possible to minimize the effect of engine drift on the comparison value of each generated knock intensity in the series. Here again, the emphasis is on a fuel system that can rapidly and accurately supply various fuels when required.

Computers that would be operable in this invention are well-known. One such computer is Model PDP8E Digital Computer, sold by Digital Equipment Corp., Maynard, Massachusetts.

Octane numbers can be calculated from the knock intensity signals in various ways. It is preferred in this invention to calculate the unknown fuel octane number with calculating means adapted to solve the following equation:

$$ON=L + (H-L)\ b-c/b-a$$

where $ON$ = octane number of the unknown fuel $H$ = octane number of the higher octane reference fuel $L$ = octane number of the lower octane reference fuel $c$ = knock intensity signal units from the unknown fuel $a$ = knock intensity signal units from the higher octane reference fuel $b$ = knock intensity signal units from the lower octane reference fuel.

FIG. 3 shows only one, 8, of a plurality of fuel reservoirs in communicating relation with spill chamber 41. Fuel container 57A inverted in container support 55 provides fuel 57 having a level 58. Reservoir 8 communicates with fuel feed chamber 9 by gravity feed through fuel line 59, tee 60, fuel-shut-off valve 39 and fuel line 42 having nozzle 42A. Line 42 is an embodiment of line 17 in FIG. 2. Spill chamber 41 communicates with fuel/air mixing venturi 26 through riser column 47, restricted orifice 49 and fuel line 50. The fuel feed-rate is variable (controlled by fuel-rate metering device 27) according to thread positioning by screw 52 of integral needle 48 in orifice 49. Screw 52 is responsive to geared-down stepping motor 51 at definite metering settings according to fuel metering rate control signals provided by control means 34 shown in FIG. 2.

Fuel feed-rate settings can be applied by means responsive to analog or, preferably, digital signals. True signal responses are easily attained in a screw-controlled needle valve by rotating the screw with a control motor having high torque. However, such guaranteed action can damage the setting reliability of a screw needle were it to jam the needle in the orifice. Thus, it is preferable to drive the screw by a relatively low torque and incorporate a measuring analog follower to signal that the actual feed setting is the setting directed by the control means. Thus, a stepping motor used to rotate a screw-controlled needle valve is easily checked by a potentiometer meshed to transmit a proportion of a constant applied voltage over the same range of screw turning, and the potentiometer voltage can be read in terms of the rate setting as checked.

In FIG. 3, valve 39 is responsive to a control signal which selects a particular feed for feeding into spill chamber 41. Spill chamber 41 has a low volume fuel holdup, say, about 0.04–0.5 cubic inches, and has overflow trough 44 surrounding it inside shell 43. Overflow lines 45 and 46 are in drain-off relation to trough 44. Fixedly positioned exit nozzles 42A direct fuel into chamber 41 as a jet stream (but without said fuel bouncing out) when valve 39 is open; and the fuel drips into trough 44 should valve 39 leak when closed. It has been found that appropriate angles for nozzle 42A are about 10° to 25° from the horizontal.

Line 59 is large enough to permit bubbles in the fuel to rise to level 58, and accordingly is at least about 3/16 inch in inside diameter. Line 42 is small (up to about 0.062 inch inside diameter) to minimize the time and fuel required to rinse the system between test sequences for octane determinations and in conjunction with nozzle 42A when valve 39 is open. Nozzle 42A is relatively small (e.g. up to about 0.035 inch inside diameter) to insure that a fuel feed from it with valve 39 open streams as a jet into chamber 41. Chamber 41 and the inside diameters of column 47 and line 50 are small to facilitate rapidly changing test engine operating fuel from one to another. However, column 47 has a large enough diameter (e.g. at least 3/16 inch) to allow bubbles therein to rise to fuel surface in chamber 41. Level 58 is higher than chamber 41 to insure that fuel delivery to chamber 41 is adequate to overflow to trough 44 regardless of the feed rate setting.

Shut-off valve 39 is preferably oriented for fuel exit at its top side. It is preferably in heat exchange contact with cooling means 40, typically a tube of appropriate cross-section adapted to a flow of cooling liquid through it. Drain valve 61 allows the fuel to be quickly drained from reservoir 8, rinsed and replaced with a different fuel for another series of octane determinations.

In the embodiment of FIG. 3 reservoir 57 provides gravity fuel flow through line 59, tee 60 up and out the top of solenoid-responsive valve 39, through line 42 and directly into chamber 41 when valve 39 is open. Fuel flow from nozzle 42A on line 42 is made practically constant because variations of level 58 as a result of using fuel in container 57A are small (e.g. ⅛ ⅛inch) in comparison to the level difference (e.g. 3 to 6 inches) between level 58 and nozzle 42A. Lines 59 and 42, tee 60 and valve 39 are selected and arranged to have no zones where vapor can accumulate. Line 42 preferably extends a short distance vertically from the upper side of tee 60. Cooling means 40 helps to avoid vapor formation by avoiding fuel warm-up and to have no zones where liquid can accumulate during draining and rinsing valve 61.

The fuel level maintained in chamber 41 has a constant head below the fuel exist at throat 26. The low pressure created at throat 26 draws the fuel up through line 50 and column 47. Chamber 41 is provided with a fuel flow from line 42, or any other like line from a reservoir not shown, adequate to keep fuel in chamber 41 overflowing, thus maintaining a constant level at the top edge of chamber 41 without floats and valves which are prone to sticking and clogging. The low volume holdup of chamber 41 in combination with an overflow fuel feed to it enables the quick transition of engine operation from one fuel to another.

Described now is a typical process for determining octane numbers using the combination according to FIG. 2: Reservoirs 1 and 8 are charged with reference fuels of known octane numbers and reservoirs 2 to 7 are charged with fuels of unknown octane numbers. The reference fuels are chosen so that their octane numbers encompass the anticipated octane number range of the unknown fuels. The levels of the reservoir are above fuel entry points into chamber 9. The operational sequence, then, is as follows:

I. control means 34 opens valve 18 (reference fuel) and, in sequence, while it is open sends a series of, say five, different fuel feed-rate signals to rate metering means 27, each for a relatively short fixed time of about 20 to 40 preferably 30 seconds selected to encompass the maximum knock setting for any fuel, memory means 33 and calculating means 35 receive a knock intensity signal generated by engine operation on each feed-rate setting, calculating means 35 calculates the approximate fuel feed-rate setting at the point of maximum knock intensity from knock intensity signals and fuel feed-rate settings on a parabolic curve passing through the highest knock intensity signal received during the series, and calculating means 35 directs control means 34 to send to rate metering means 27 a series of fuel feed-rate settings above and below the approximate maximum knock intensity fuel feed-rate setting just calculated, each for a relatively short fixed time of about 20 to 40 seconds, preferably 30 seconds, and calculating means 35 calculates a refined maximum knock intensity fuel feed-rate setting from the parabolic curve passing through the refined highest knock intensity signal and adjacent lower knock intensity signals received during the series, then, calculating means 35 transfers the refined maximum knock intensity feed-rate setting to memory means 33 where it is correlated with the reservoir providing the fuel and stored, II. repeat the above, but each time with a different valve selected from valves 19 to 25, III. then valve 18 (reference fuel) is opened and the calculated maximum knock intensity feed-rate setting from means 33 is transmitted to means 27. The knock test engine is operated for a time sufficient to result in a new knock intensity during a fixed time of between about 1 to 3 minutes, and a new knock intensity signal is received in means 33 and 35 during the knock intensity measuring time, IV. repeat III with valve 19 open from reservoir 2 (a fuel of unknown octane number), and then with valve 25 open (the other reference fuel), V. repeat IV but interpose between the reference fuels, each of the remaining unknown fuels from reservoirs 3 to 7, transfer to means 35 the new knock intensity signals of each fuel from reservoirs 2 to 7 and its immediately preceding and succeeding reference fuel knock intensity signals according to III, IV and V, and calculate by means 35 the octane number of the unknown fuels according to their new knock intensity signals relative to the new knock intensity signals of the reference fuels measured immediately before and after each unknown fuel.

The test engine is set for proper operating conditions for the octane range chosen as will be appreciated by those skilled in the art employing such guides as, say, Test Method D-2699-Test for Knock Characteristics of Motor Fuels by Research Methods, D-2700-Test for Knock Characteristics of Motor and Aviation Type fuels by the Motor Method and D-2885-Research and Motor Method Octane Ratings Using On-Line Analyzers, all described in ASTM Manual for Rating Motor, Diesel and Aviation Fuels (1971).

The novel apparatus of this invention can operate with any number of fuel sources supplying fuel to the spill chamber herein described. It has been found, for instance, that the apparatus can automatically find fourteen octane numbers within about 3½hours.

The embodiments of the invention in which an exclusive property or privilege is claimed are defined as follows:

1. In an apparatus for feeding an internal combustion engine with fuel mixed with air, said apparatus comprising multiple fuel sources that cooperate with a spill chamber surrounded by an overflow trough, each fuel source cooperating through a feed line having an on-off valve along its length and an exit to said chamber, said chamber feeding fuel to a fuel/air mixing device that cooperates with said engine, the improvement comprising:

i. the feed line and on-off valve being related to fuel flow direction in that said feed line and on-off valve are positioned so that fuel in the feed line travels generally in a direction away from gravity pull immediately before and after passing through said valve, and ii. the feed line exit is fixedly positioned to direct a jet of fuel into the chamber when the valve is turned on and to drip leaking fuel into said trough surrounding the chamber when the valve is turned off.

2. In an apparatus for determining the octane numbers of fuels of unknown octane numbers that are fed to a knock test engine from a source of each fuel of known and unknown octane numbers wherein said knock test engine generates knock intensity signals for each fuel of known and unknown octane numbers over a range of fuel feed-rates, said apparatus comprising:

fuel feed means adapted to feed a fuel of known octane number and a fuel of unknown octane number to the test engine, a knock intensity receptor that accepts knock intensity signals from the test engine and transmits them to memory means, memory means that store knock intensity signals transmitted by the receptor and transmit such signals to the calculating means, calculating means that compare knock intensity signals of known and unknown octane fuels to determine unknown octane numbers, wherein the improvement comprises said fuel feed means having a feeding apparatus between the fuel source and the knock test engine by means of which there is cooperation between the furl source and a spill chamber surrounded by an overflow trough, through a feed line having an on-off valve along its length and an exit to said chamber, said chamber feeding fuel to said knock test engine, said feeding apparatus characterized in that:

a. the feed line and on-off valve are related to fuel flow direction in that said feed line and on-off valve are positioned so that fuel in the feed line travels generally in a direction away from gravity pull immediately before and after passing through said valve, and b. the feed line exit is fixedly positioned to direct a jet of fuel into the chamber when the valve is turned on and to drip leaking fuel into said trough surrounding the chamber when the valve is turned off.

* * * * *